United States Patent [19]

Rosier et al.

[11] Patent Number: 5,625,409

[45] Date of Patent: Apr. 29, 1997

[54] HIGH RESOLUTION LONG-RANGE CAMERA FOR AN AIRBORNE PLATFORM

[75] Inventors: Jean-Claude Rosier, Giverny; Francis Bretaudeau, Rouen, both of France

[73] Assignee: Matra Cap Systemes, Velizy-Villacoublay, France

[21] Appl. No.: 515,496

[22] Filed: Aug. 16, 1995

Related U.S. Application Data

[63] Continuation of Ser. No. 136,001, Oct. 14, 1993, abandoned.

[30] Foreign Application Priority Data

Oct. 14, 1992 [FR] France ................... 92 12297

[51] Int. Cl.⁶ ............................................. H04N 5/225
[52] U.S. Cl. ........................ 348/117; 348/218; 348/144
[58] Field of Search .............................. 348/117, 218, 348/144, 145, 146, 147, 215, 216, 217, 317

[56] References Cited

U.S. PATENT DOCUMENTS

| | | | |
|---|---|---|---|
| 4,152,724 | 5/1979 | Hunter | 348/144 |
| 4,551,758 | 11/1985 | Masunaga et al. | 348/317 |
| 4,747,155 | 5/1988 | Dotson | 348/145 |
| 4,769,552 | 9/1988 | Boue et al. | 348/217 |
| 4,951,136 | 8/1990 | Drescher et al. | 348/145 |
| 5,118,925 | 6/1992 | Mims et al. | 250/214 VT |
| 5,164,823 | 11/1992 | Keeler | 348/144 |
| 5,166,789 | 11/1992 | Myrick | 348/144 |
| 5,179,445 | 1/1993 | Hadfield | 358/219 |
| 5,251,037 | 10/1993 | Busenberg | 348/147 |
| 5,270,756 | 12/1993 | Busenberg | 348/144 |

*Primary Examiner*—Wendy Garber
*Attorney, Agent, or Firm*—Larson and Taylor

[57] ABSTRACT

A camera device comprises a first detector having opto-electronic sensors for enabling an entire image to be input simultaneously, and associated with an optical system of long focal length. A second detector is associated with an optical system that gives a large field of view, covering the field of the first detector and extending beyond it. The camera device also includes means for synchronizing the images taken by the two detectors and for recording them.

13 Claims, 4 Drawing Sheets

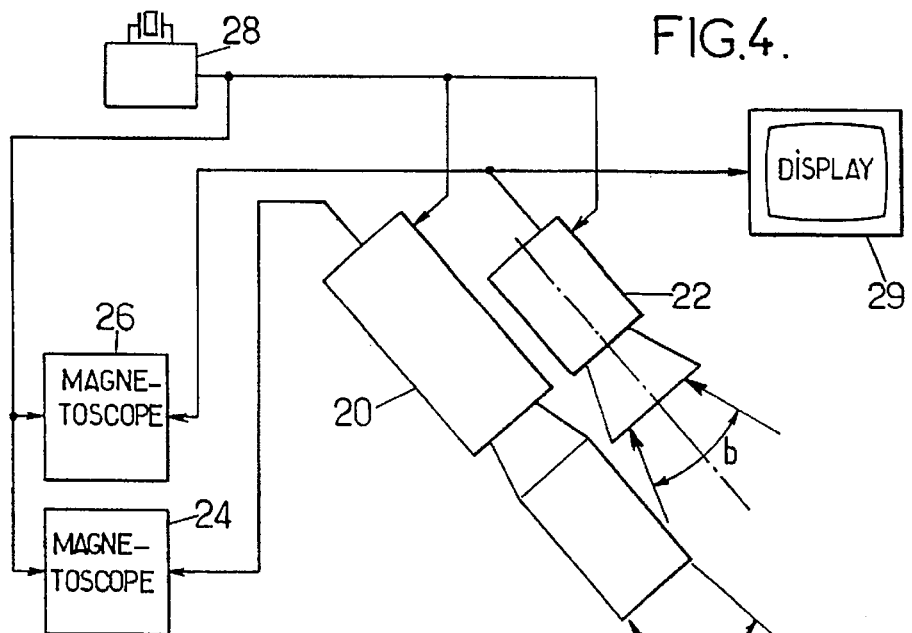
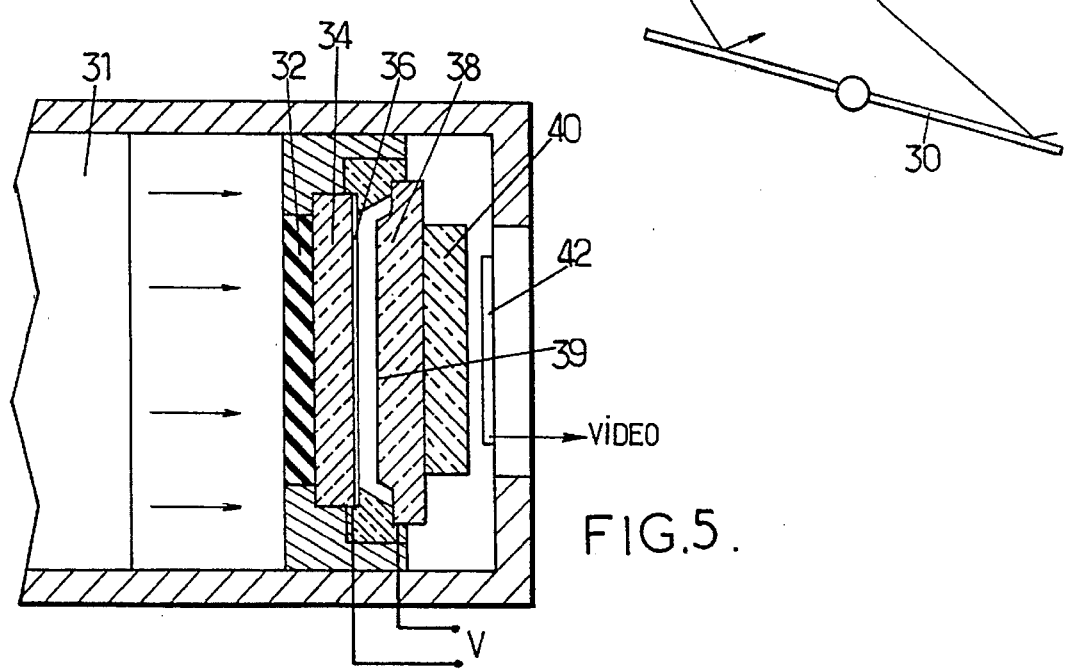

HIGH RESOLUTION LONG-RANGE CAMERA FOR AN AIRBORNE PLATFORM

This application is a continuation of application Ser. No. 08/136,001 filed Oct. 14, 1993, now abandoned.

BACKGROUND OF THE INVENTION

The present invention relates to cameras designed to be mounted on an airborne platform to provide recordable high-resolution images of a scene in the form of a strip that is elongate in the travel direction of the platform.

A particularly important application of the invention lies in the field of devices for air reconnaissance at a safe distance and placed on an airborne platform (generally an aircraft) whose motion causes the scene to be scanned in the travel direction of the platform. The speed of the platform determines the apparent speed of the scene and the rate at which images must be taken in order to ensure that successive images overlap in the travel direction.

In many cases, the resulting images must be of high resolution, compatible with the smallest size of object to be identified. When it is desirable to have an image that can be used immediately, which excludes the use of a photographic camera, the most appropriate detector is a camera having a matrix of sensors, generally charge-coupled sensors, that provide high resolution in the focal plane. In spite of such high resolution, the identification of objects at a safe distance (generally more than 15 km), and seen at an oblique angle, requires the field to be reduced to a very small size by using an optical system of long focal length. Consequently, the apparent speed of the image is too fast for said image to be reproduced on a monitor enabling the pilot of the aircraft to perform surveillance in the scanned strip. In practice, a full screen goes past in less than one second.

Numerous types of high-resolution long-range camera have been proposed. However known solutions suffer from one or more defects: they require the detector to be gyroscopically stabilized in order to conserve coherence between successive images in the travel direction suitable for enabling them to be connected one to another in spite of the pitching motion of the platform, and above all its rolling and yawing motion; they exclude any possibility of being associated with the display tools and detectors already commonly used on board reconnaissance aircraft; they have insufficient sensitivity at low light levels; and they do not enable the pilot to supervise the acquisition of images because of the apparant speed being too fast.

SUMMARY OF THE INVENTION

It is object of the invention to provide an improved long-range camera device. It is a specific object to reconcile the a priori contradictory requirements of image resolution, of possible supervision, and of acquisition in a form that is directly usable (in particular recording on a video tape recorder).

To this end, there is provided a device comprising a first detector having a matrix of opto-electronic sensors and capable of simultaneously transferring an entire image frame, the first detector being associated with an optical system of long focal length, the device also comprising a second detector fixed to the platform, associated with an optical system giving a large field of view that covers the field of view of the first detector and that extends beyond it, together with means for synchronizing image transfer from the two cameras and the recording thereof.

Each of the detectors advantageously uses a matrix of charge-coupled devices (CCD) having an integration time that is selected as a function of the speed of the platform so that the streaking and the transverse shaking due to the motion of the airplane during integration remain compatible with the definition. By way of example, for an airplane flying at 300 meters per second (m/s) and for an integration time of 1 millisecond, streaking represents 0.3 meters (m) on the ground, which is compatible with the maximum spatial period of 1.6 m to 2 m that it is generally desired to detect.

The detector may be a CCIR standard CCD camera compatible with the most usual of on-board video recorders. Such cameras having a matrix of 580×750 pixels already exist and enable image acquisition to be performed at a rate of twenty-five complete frames per second, it being possible to perform playback by means of interlaced fields even though acquisition must be performed simultaneously over an entire frame. Such a rate of twenty-five frames per second makes it possible to achieve a high degree of overlap between successive frames in the airplane travel direction, thus enabling the scene to be reconstituted in full. Continuous display of the image provided by the second detector on a display monitor enables the pilot to perform supervision. By recording the frames provided by both detectors synchronously, e.g. by controlling the operation of both of them from the same clock, and by recording them on two tracks of the same video recorder or on two synchronized video recorders provided with inlaying means specifying the instants at which the images are taken, it is possible subsequently to associate the frames with one another by identifying the small-field frames within the large-field frames, without it being necessary to stabilize the aiming of the detectors.

In a particular embodiment, for taking images over a strip wider than the small field, the device further includes an optical scanning member that operates transversely to the travel direction, and that is capable of taking up a plurality of successive positions in which the field of the first detector covers different zones on the ground. A mosaic of images is thus obtained, which images can be positioned relative to one another by means of the recording provided by the large field detector, which does not need a scanning member.

To enable the device to be used at low light levels, it is advantageous to interpose a light intensifier between the detector and the long focal length optical system. The intensifier makes it possible to reduce the integration time and, in an advantageous embodiment, makes it possible to adapt to the level of illumination. The intensifier may also be used as a shutter.

In another particular embodiment, where the first detector includes a matrix of sensors disposed in rows and columns (e.g. a CCD camera target), the device includes a plurality of light guides forming images on respective zones, each constituted by a fraction of the rows of the matrix, and together representing different parcels that are offset laterally relative to one another in the strip direction and that optionally may also be offset longitudinally. The light guides may be sheets of optical fibers that are curved or oblique, having end faces that are then machined so as to occupy a single plane parallel to that of the matrix.

The invention will be better understood on reading the following description of a particular embodiment given by way of non-limiting example.

BRIEF DESCRIPTION OF THE DRAWINGS

FIG. 4 is a diagram of a device enabling reconstruction of the kind shown in FIG. 3 to be performed;

FIG. 5 is a diagram showing a detector provided with a light intensifier that is also capable of constituting a shutter;

DETAILED DESCRIPTION OF AN EMBODIMENT

Figure 1:
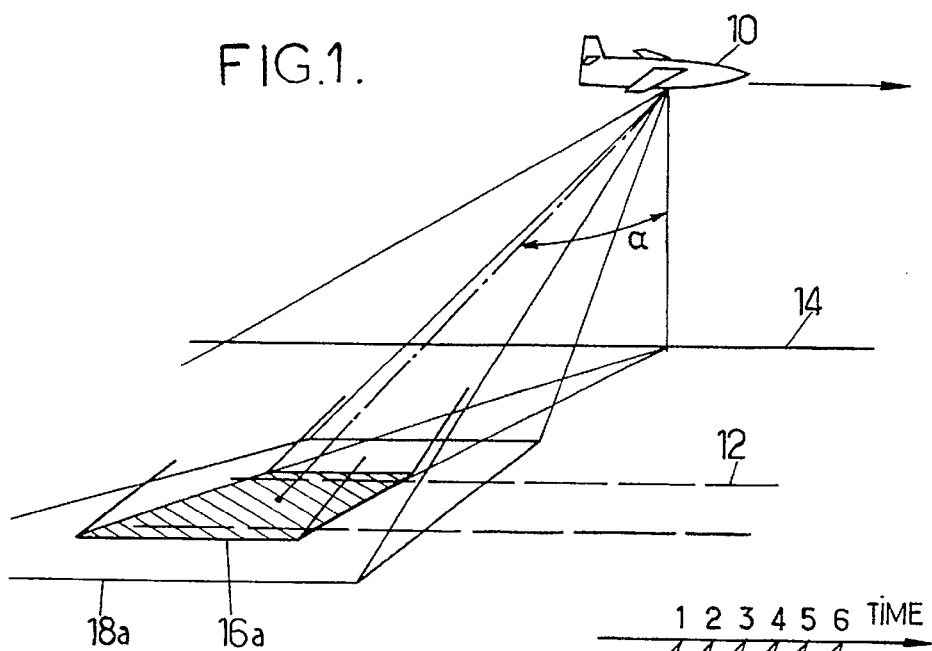
FIG. 1 is a theoretical diagram showing how the fields of view of the two detectors in apparatus of the invention are superposed.

By way of example, FIG. 1 shows an aircraft 10 from which it is desired to obtain an image of a scene 12 constituted by a strip parallel to the travel direction of the aircraft and offset laterally by a safe distance: in practice, that leads to a distance between the strip and the ground trace of the airplane flight path that exceeds 15 km.

For this purpose, the aircraft is provided with a detector whose optical system has a focal length that is long enough for the resolution of the detector to enable objects to be distinguished having a length of the order of 0.8 m. This gives rise to a field of view that is small. In the representative case of a detector constituted by a CCD matrix camera having 750 by 580 pixels, the focal length is such that the size of the field on the ground is of the order of 200 m in each direction. By taking images in entire frames at a rate of 25 Hz, the resulting overlap between successive frames 16a, 16b, . . . is of the order of one-twentieth of the length of the frame, which should enable the scene to be reconstituted from a recording on a video recorder. Streaking and image motion can be made acceptable by adopting an integration time that is short enough, e.g. 1 ms for an airplane flying at 300 m/s, which corresponds to streaking of 0.3 m.

Nevertheless, this possibility remains theorical if the camera is not gyro-stabilized. Under such circumstances, between two successive images 16a and 16b being taken, the attitude of the aircraft will have changed. As a result, the images cannot be connected together merely by being shifted. Relative rotation is also required so as to convert an image 16b into 16b'. In addition, the images scroll on a display screen too quickly for the pilot to be able to supervise the taking of images.

These drawbacks are obviated by recording, simultaneously with the high resolution and small field images of the first detector, images occupying a larger field of view (advantageously about ten times larger in the longitudinal direction) provided by another detector operating synchronously with the first. Consequently, each recorded image, e.g. 16a, is associated with another image 18a taken simultaneously (FIG. 1), or in a determined time relationship therewith. The second image makes it possible:

to situate accurately the location of the high resolution image; and to facilitate matching of the images for playback purposes.

In some applications, it is necessary to have an image of a scene that is constituted by a strip 12 that is wider than the field of view of the first detector.

Figure 3:
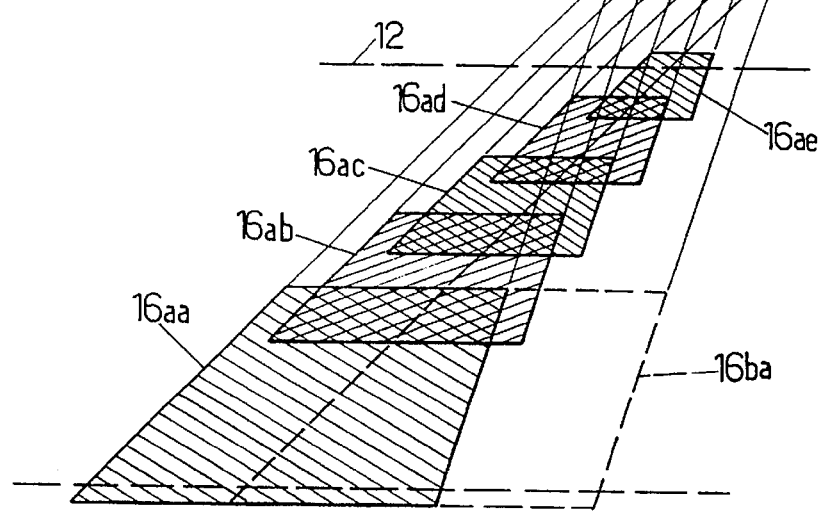
FIG. 3 shows a mosaic of successive fields of view enabling the image of a scene to be built up in the form of a strip of width that is greater than the field width of the small field detector.
Figure 2:
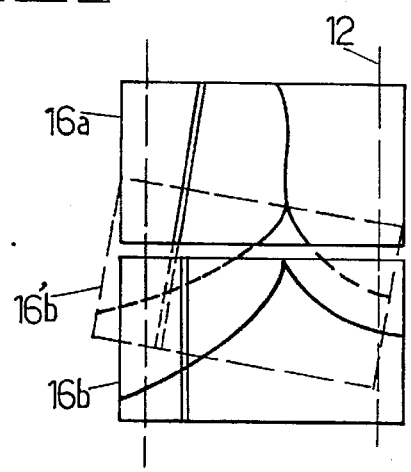
FIG. 2 shows two successive images taken by the small field detector and the offset that enables them to be connected together.

This result can be achieved by cyclically changing the elevation angle $\alpha$ (FIG. 1) of the first detector to obtain high resolution images that are laterally offset relative to one another and that overlap. FIG. 3 shows fields of view on the ground 16aa, . . . , 16ae from the first detector for progressively decreasing elevation angles of said first detector, the images being taken at instants 1, 2, . . . , 5. An integration time of one millisecond makes it possible to take a plurality of different images corresponding to different elevation angles while ensuring overlap between two successive images 16aa and 16ab that are in alignment.

Here again, the images can be repositioned relative to one another by referring to the image provided by the low resolution and large field detector.

The theoretical structure of the device may be as shown in FIG. 4. The device shown comprises a first detector 20 and a second detector 22 which are both fixed on the platform, and which have respective angular fields of view a and b, both detectors being constituted by respective CCD matrix cameras. The cameras 20 and 22 are connected to respective video recorders 24 and 26. The operation of the cameras and of the video recorders is synchronized by means of a common time base 28. A monitor screen 29 enables the large field b scene recorded by the camera 22 to be displayed.

As mentioned above, the width of the scene observed may be increased by periodically changing the elevation angle of the camera 20. In order to enable the camera 20 to remain fixed, it is advantageous to change its elevation angle by means of a deflector 30, e.g. a mirror under the control of a stepper motor (not shown).

The short exposure time and the small aperture a of the long focal length optical system of the camera 20 give rise to low light levels in the focal plane containing the CCD matrix. To obviate this shortcoming, a light intensifier is advantageously interposed between the optical system and the camera proper. To prevent images being distorted, the intensifier used is advantageously proximity focused (e.g. having an intrinsic resolution of 80 pixels per millimeter), with an outlet coupled with optical fibers. The camera 20 then advantageously has an optical fiber inlet window for ensuring good optical coupling.

FIG. 5 shows one possible structure for the intensifier. Light focused by the long focal length optical system 31 passes through a protective slab 32 and then through a plate 34 carrying a photocathode 36 on its rear face. A photoelectron acceleration space having a thickness of about 1 mm and subjected to a high electric field separates the photocathode 36 from an optical fiber bundle slab 38 whose front face carries a short remanence phospor layer 39. The slab 38 is directly in contact with the inlet window 40 of the CCD matrix camera 42, which window is likewise constituted by a bundle of optical fibers. The amplified photon image is thus conveyed point by point to the matrix CCD target by photon-electron-photon conversion. Conversion gain may be a few hundreds.

The high voltage V that creates the accelerating electric field may be pulsed so that the intensifier also constitutes a shutter. Exposure time may be very short, less than 1 ms, with the short integration time being compensated by the amplification gain.

Such an intensifier enables images to be taken under a very wide range of lighting conditions, and in practice from about 300 lux, while using existing components and in particular a CCIR standard camera compatible with common video recorders. The intensifier-camera assembly does not add distortion to the image in addition to that of the optical system. Providing the integration time remains short relative to movements of the airplane, there is no degradation due to camera motion.

A CCIR standard camera 20 provides a signal that is compatible not only with common video recorders, but also with other equipment such as digitizing cards that enable data to be obtained from the output signal of the camera that is suitable for recording in digital form and that can be processed digitally.

Nevertheless, the camera is not used conventionally i.e. with acquisition of two interlaced fields of 290 lines each, since the two fields would then be spatially offset. The camera may be conventional, but it is modified so that both fields are obtained simultaneously, at a rate of 25 complete frames per second. This does not prevent image data subsequently being transferred to a video recorder field by field (even and odd) so that the recording is conventionally structured.

The embodiment shown in FIGS. 3 and 4 uses a mirror 30 having N angular positions (where N is greater than 1). In some cases, mechanically controlling the direction of field of view constitutes a handicap. It is necessary to wait for the mirror to be completely stabilized between acquiring two images. The time taken by the mirror to return to the original position gives rise to a small interruption in the scanning rate and makes it necessary to know the position of the mirror accurately before restarting acquisition. Finally, the mechanism for a moving mirror is bulky.

A modified embodiment will now be described that enables mechanical scanning to be avoided, at the cost of shortening the length of each elementary image 16aa, 16bb, ... in the direction of travel.

Figure 6:
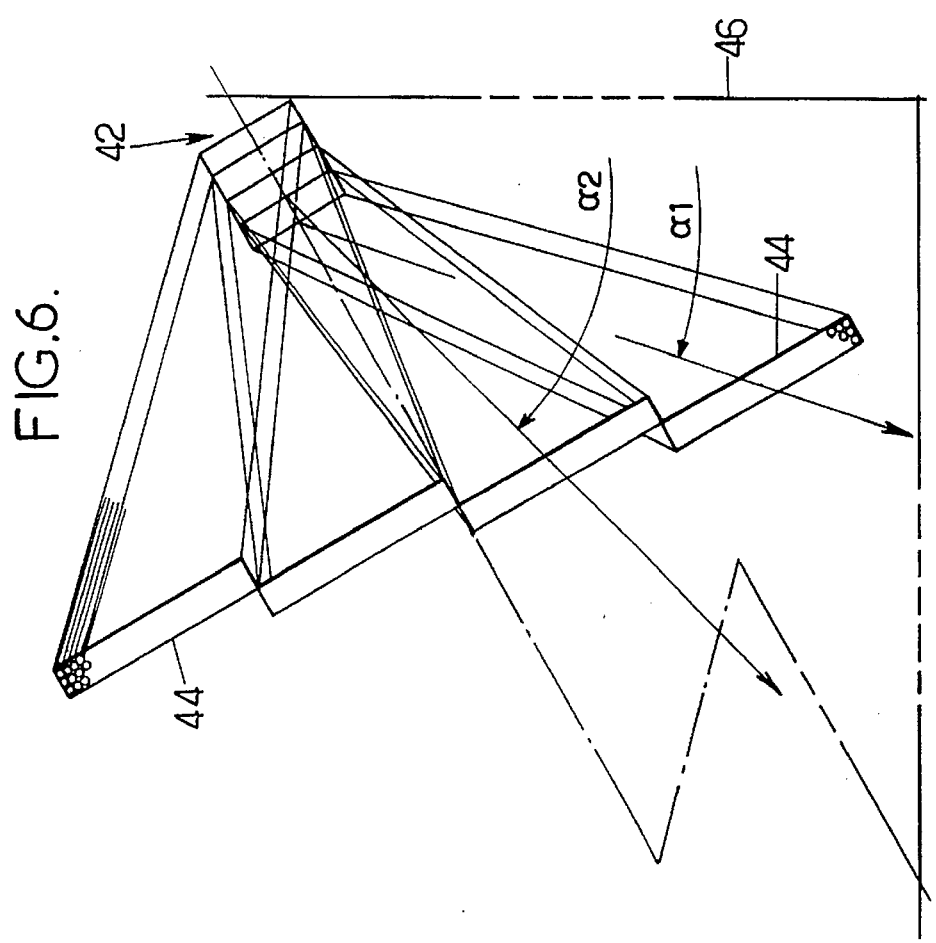
FIG. 6 is a theoretical diagram showing how a mosaic can be reconstituted without use of moving parts.

The principle of this modification is shown diagrammatically in FIG. 6. The matrix of sensors 42 is associated with N sheets of optical fibers 44 (where N is equal to 4 in the example shown), which sheets are disposed so as to obtain four fields of view that are angularly offset from one another in the lateral direction.

In FIG. 6, it can be seen that the centers of the fields are offset angularly by α1, α2, ... relative to a vertical line 46 drawn from the airplane.

Each sheet is coupled with a fraction 1/N of the inlet window (40) of the camera or of the intensifier which is provided, in this embodiment, with a protective stab 32 and a plate 34 each constituted by a bundle of optical fibers. In the example shown, each sheet illuminates 145 rows of 756 pixels each. Thus, the image of the ground as taken at any given instant may have the appearance shown in FIG. 7. It is made up of four parcels 16aa, ... , 16ad. Each parcel constitutes an image made up of 145 by 756 pixels and the relative disposition of the parcels is entirely coherent and not subject to any bias. Acquisition may take place once every 40 ms. Between two acquisitions, the airplane moves forwards. A new image is then taken. It corresponds to simultaneous input of four following parcels 16ba, ... , 16bd as shown in FIG. 8. Images are taken at a rate sufficient to ensure that there is always some overlap between successive images, e.g. between 16aa and 16ba.

Figure 7:
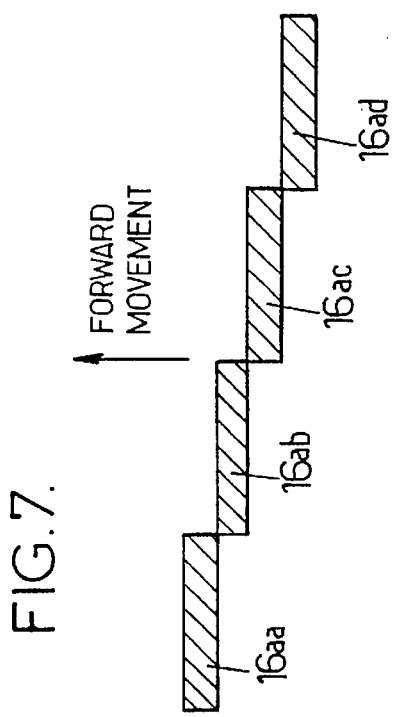
FIG. 7 shows one possible disposition of parcels whose images are formed simultaneously.
Figure 8:
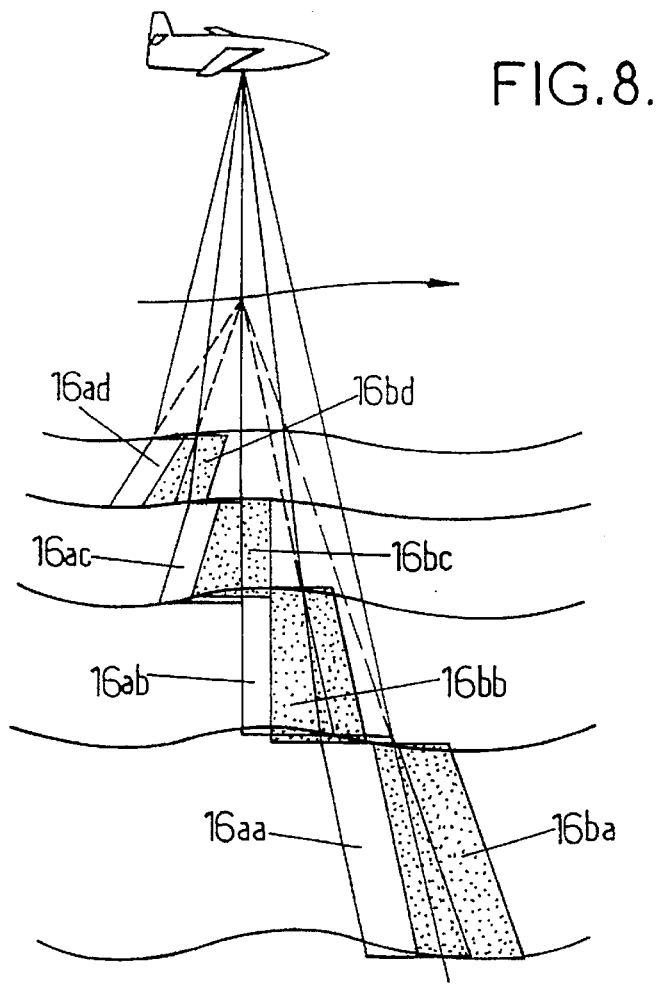
FIG. 8 shows the overlap of parcels similar to those of FIG. 7 during the advance of the platform carrying the apparatus.

Various sheet structures can be used to obtain the parcel distribution shown in FIGS. 7 and 8.

In the example shown in FIG. 6, each sheet has inlet and outlet terminal faces that are machined so as to make angles α1, α2, ... with the main axes of the fibers. These sheets of fibers are spread apart in parallel planes and their inlet terminal faces are contained in a plane parallel to the plane of the target.

Figure 9:
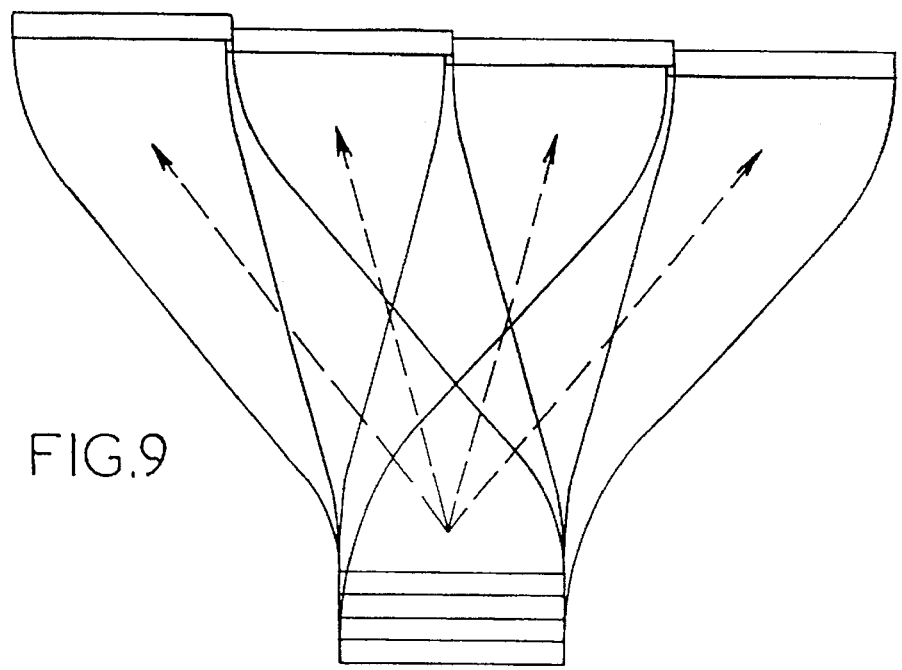
FIG. 9 shows apparatus constituting a modification of that shown in FIG. 6.

In the embodiment shown in FIG. 9, the N sheets are curved so that light enters and exits the fibers axially. The shape shown in FIG. 9 may be obtained by curving the fibers while hot.

Light collection efficiency is equal for all of the parcels in the embodiment shown in FIG. 9. In contrast, in the embodiment shown in FIG. 6, light transmission to the intensifier and thus to the camera is not identical from one sheet to the next because of the differences between the angles of incidence of the photons relative to the sheets of optical fibers. It is also necessary to ensure that the end angles of incidence are less than the angular aperture of the optical fibers which is slightly greater than 30°.

To take differences between sheets into account, it is therefore necessary to calibrate each of the zones of the camera so as to apply a gain-correcting coefficient thereto during image processing.

Whichever of the two solutions is used, the apparent width of the CCD matrix is multiplied by N (where N may be greater than 4) while high resolution is conserved.

Given that each recorded image contains four zones, shifts are necessary for spatially repositioning the images of the zones relative to one another. This repositioning is done after digitizing, by processing the presents no difficulty.

The successive high-definition images recorded on the video recorder can be repositioned relative to one another by autocorrelation with the images from the large-field camera, e.g. in application of the method described in French patent application No. 92 07977.

In general, successive images present considerable overlap in the longitudinal direction. For example, in the case shown in FIG. 8, for an airplane flying at 300 meters per second at an altitude 8,500 meters, with images being taken at 25 frames per second, and with an optical system giving parcels that are 55 meters long in the travel direction, the amount of overlap is 78%. A point on the ground is thus scanned 4.6 times, on average.

This superposition of images can be made use of in several different ways.

The signal/noise ratio can be improved by a factor that is substantially equal to the square root of the number of scans, i.e. about 2.2 times.

It is also possible, by sampling the images taken and by superposing them accurately, to increase the spatial resolution of the system.

More precisely, resolution can be improved by oversampling all of the images taken of the same scene, and by repositioning the various over-sampled frames so as to superpose them.

We claim:

1. A camera device for use on an airborne platform to provide recordable high-resolution images of a scene in the form of a strip that is elongated in a travel direction of the platform, said camera device comprising:

first detector means arranged for being securely connected on the platform, including a first detector having a two dimensional matrix of opto-electronic sensors and a first optical system of long focal length forming an image of a zone of said scene on said first detector which is arranged to acquire all points of said image simultaneously and to deliver a signal representing said image as a full frame on an output thereof;

second detector means arranged for being securely connected to the platform, including a second detector having a two dimensional matrix of opto-electronic sensors and a second optical system, having a short focal length as compared with the focal length of said first optical system, forming an image on said second detector which is arranged to deliver a signal representing the image formed on said second detector;

means for synchronizing times at which images are simultaneous taken by the two detector means and for recording the signals representing the images, said times being sufficiently close to each other for two successive images from said first detector means to overlap mutually;

optical scanning means optically associated with said first detector means for scanning transversely to said travel direction, arranged for directing a field of view of said first detector means into a plurality of successive directions for scanning transversely to said travel direction, said successive directions being such that different zones of the scene each in the field of view of said first detector in a respective one of said successive directions overlap partially and are all within the field of view of said second detector; and image processing means for mutually repositioning said images formed by said first detector means and providing a two dimensional mosaic of images.

2. A camera device according to claim 1, wherein each of said first and second detectors includes a matrix of charged-coupled sensors having an integration time selected as a function of the speed of the platform so that streaking and transverse movements due to motion of the platform during integration remain compatible with a desired definition.

3. A camera device according to claim 2, wherein each of the first and second detectors is associated with means for transferring each image generated by the respective detector as a full frame to a recorder in the form of two interlaced fields.

4. A camera device according to claim 1, wherein said first detector means has a light intensifier placed between said long focal length optical system and said first detector.

5. A camera device according to claim 4, wherein said light intensifier is energized by pulsed high voltage for generating short exposure times and constituting a shutter.

6. A camera device according to claim 1, wherein the intensifier has proximity focussing and has an output coupled to a bundle of optical fibers.

7. A camera device for use on an airborne platform to provide recordable high-resolution images of a scene in the form of a strip that is elongate in a travel direction of the platform, said camera device comprising:

first detector means arranged for being securely connected on the platform, including a first detector having a matrix of opto-electronic sensors and a first optical system of long focal length forming an image of a zone of said scene on said first detector which is arranged to deliver a signal representing said image as a full frame on an output thereof; and a light intensifier placed between said long focal length optical system and said first detector, energized by high voltage pulses;

second detector means arranged for being securely connected on the platform, including a second detector having a matrix of opto-electronic sensors and a second optical system, having a short focal length as compared with the focal length of said first optical system, forming an image on said second detector which is arranged to deliver a signal representing the image formed on said second detector; and means for synchronizing the times at which images are taken by the two detector means and for recording the signals representing the images;

wherein said first detector includes a matrix of sensors disposed in rows and columns and said first detector means further comprises a plurality of light guides forming images of different ground parcels on zones of said first detector each constituted by only some of the rows of the matrix, said different ground parcels being offset laterally relative to one another and all being within the field of view of said second detector.

8. A camera device for use on an airborne platform to provide recordable high-resolution images of a scene in the form of a strip that is elongate in a travel direction of the platform, said camera device comprising:

first detector means arranged for being securely connected to the platform, including a first detector having a two dimensional matrix of opto-electronic sensors disposed in rows and columns and a first optical system of long focal length forming an image of a zone of said scene on said first detector which is arranged to acquire all points of said image simultaneously and to deliver a signal representing said image as a full frame on an output thereof; a light intensifier placed between said long focal length optical system and said first detector; and means for periodically energizing said light intensifier by high voltage pulses of short duration, whereby said light intensifier constitutes a shutter of said first detector means;

second detector means arranged for being securely connected on a platform, including a second detector having a two dimensional matrix of opto-electronic sensors and a second optical system, having a short focal length as compared with the focal length of said first optical system, forming an image on said second detector which is arranged to deliver a signal representing the image formed on said second detector, said second optical system having a field of view that includes said zone and overlaps the field of view of said first detector means; and means for synchronizing times at which images are taken by the detector means and for recording the signals representing the images, said times being sufficiently close to each other for two successive images from said first detector means to overlap mutually; and image processing means for mutually repositioning said images formed by said detector means by correlation with said images provided by the second detector means at the same time and providing a mosaic of said images formed by said first detector means.

9. A camera device according to claim 1, wherein the first detector includes a matrix of sensors disposed in rows and columns and the first detector means further comprises a plurality of light guides forming images of different ground parcels on zones each constituted by only some of the rows of the matrix, said different ground parcels being offset laterally relative to one another.

10. A camera device according to claim 8, wherein said light guides are optical fibers distributed in sheets, said sheets being curved or disposed obliquely relative to one another, end faces of said oblique sheets being machined so as to lie in a common plane parallel to the plane of the matrix.

11. A camera device for use on an airborne platform to provide recordable high-resolution images of a scene in the form of a strip that is elongate in a travel direction of the platform, said camera device comprising:

first detector means arranged for being securely connected to the platform, including: a first detector having a two dimensional matrix of opto-electronic sensors disposed in rows and columns and a first optical system of long focal length forming an image of a zone of said scene on said first detector which is arranged to acquire all points of said image simultaneously and to deliver a signal representing said image as a full frame on an output thereof; and a plurality of light guides located for forming individual images of different ground parcels which together constitute said zone, each said individual image being formed on only some of the rows of the matrix, said different ground parcels being mutually offset relative to one another laterally with respect to said travel direction;

second detector means arranged for being securely connected on a platform, including a second detector having a two dimensional matrix of opto-electronic sensors and a second optical system, having a short focal length as compared with the focal length of said first optical system, forming an image on said second detector which is arranged to deliver a signal representing the image formed on said second detector, said second optical system having a field of view that includes said zone and overlaps the field of view of said first detector means; and means for synchronizing times at which images are simultaneous taken by the two detector means and for recording the signals representing the images, said times being sufficiently close to each other for two successive images from said first detector means to overlap mutually.

12. A camera device according to claim 11, wherein said light guides are arranged so that said different ground parcels seen by said first detector means are mutually staggered in the travel direction.

13. A method of taking pictures from air carrier, for providing recorded high-resolution images of a whole scene in the form of a strip that is elongate in a direction of travel of the carrier, comprising the steps of:

taking successive images along the strip with a first detector which is secured to the carrier and includes a two dimensional matrix of electro-optical sensors, each image being simultaneously acquired by all said electro-optical sensors as a full frame and said first detector having an optical system of long focal length, said successive images being taken at a rate sufficient for two successive images to have an overlap in the direction of travel, and for each point of said scene to appear on a plurality of said successive images;

recording the successive images delivered by the first detector;

taking successive images with a second detector also secured to the carrier, having an optical system providing a field of view greater than that of the first detector, including the field of view of the first detector and overlapping said field of view of the first detector, said second detector being synchronized with the first detector;

recording the successive images delivered by the second detector;

mutually matching the successive recorded images obtained with the first detector by correlating them with the recorded images provided by the second detector; and mutually repositioning the successive recorded images obtained with the first recorder for providing a mosaic of images.

* * * * *